(12) United States Patent
Brod et al.

(10) Patent No.: US 6,638,325 B1
(45) Date of Patent: Oct. 28, 2003

(54) OIL ADDITIVES AND COMPOSITIONS

(75) Inventors: Ramah Jessica Brod, Abingdon; Brian William Davies, Blewbury; Tuncel Ibrahim, Abingdon, all of (GB)

(73) Assignee: Infineum International Ltd. (GB)

( * ) Notice: Subject to any disclaimer, the term of this patent is extended or adjusted under 35 U.S.C. 154(b) by 0 days.

(21) Appl. No.: 08/356,194

(22) PCT Filed: Jun. 29, 1993

(86) PCT No.: PCT/EP93/01665

§ 371 (c)(1),
(2), (4) Date: Dec. 21, 1994

(87) PCT Pub. No.: WO94/00515

PCT Pub. Date: Jan. 6, 1994

(30) Foreign Application Priority Data

Jun. 30, 1992 (GB) .............................................. 9213871

(51) Int. Cl.$^7$ ................................ C10L 1/18; C10L 1/22
(52) U.S. Cl. ............................................ 44/393; 44/394
(58) Field of Search .................................. 44/393, 394

(56) References Cited

U.S. PATENT DOCUMENTS

| | | | | | |
|---|---|---|---|---|---|
| 3,402,223 A | * | 9/1968 | Hollingsworth | ............. | 260/891 |
| 3,642,459 A | * | 2/1972 | Ilnyckyj | ...................... | 44/393 |
| 3,961,916 A | * | 6/1976 | Ilnyckyji et al. | ............... | 44/393 |
| 4,211,534 A | * | 7/1980 | Feldman | ...................... | 44/393 |
| 4,404,000 A | * | 9/1983 | Toyoshima et al. | ........... | 44/393 |
| 4,661,121 A | * | 4/1987 | Lewtas | ........................ | 44/393 |

* cited by examiner

Primary Examiner—Margaret B. Medley

(57) ABSTRACT

Compositions comprising (a) an ethylene-mixed unsaturated ester copolymer or (b) two or more ethylene-unsaturated ester copolymers differing, for example, in their ester chains improve the low temperature properties of fuel oils.

20 Claims, No Drawings

OIL ADDITIVES AND COMPOSITIONS

This invention relates to oil compositions, primarily to fuel oil compositions, and more especially to fuel oil compositions susceptible to wax formation at low temperatures, and to additive compositions for such fuel oil compositions.

Heating oils and other distillate petroleum fuels, for example, diesel fuels, contain alkanes that at low temperature tend to precipitate as large crystals of wax in such a way as to form a gel structure which causes the fuel to lose its ability to flow. The lowest temperature at which the fuel will still flow is known as the pour point.

As the temperature of the fuel falls and approaches the pour point, difficulties arise in transporting the fuel through lines and pumps. Further, the wax crystals tend to plug fuel lines, screens, and filters at temperatures above the pour point. These problems are well recognized in the art, and various additives have been proposed, many of which are in commercial use, for depressing the pour point of fuel oils. Similarly, other additives have been proposed and are in commercial use for reducing the size and changing the shape of the wax crystals that do form. Smaller size crystals are desirable since they are less likely to clog a filter; certain additives inhibit the wax from crystallizing as platelets and cause it to adopt an acicular habit, the resulting needles being more likely to pass through a filter than are platelets. The additives may also have the effect of retaining in suspension in the fuel the crystals that have formed, the resulting reduced settling also assisting in prevention of blockages.

Effective wax crystal modification (as measured by CFPP and other operability tests, as well as simulated and field performance) may be achieved by ethylene-vinyl acetate or propionate copolymer (EVAC or EVPC)-based flow improvers.

In EP-A-45342 is described a cold flow additive, based on an EVAC modified by esterification with 2-ethylhexanoic, acrylic, and phthalic acids.

In "Wissenschaft und Technik" 42(6), 238 (1989), M. Ratsch & M. Gebauer describe cold flow additives including an EVAC esterified with, inter alia, n-hexanoic acid.

In U.S. Pat. No. 3,961,916, middle distillate flow improvers are described which comprise a wax growth arrestor and a nucleating agent, the former being preferably a lower molecular weight ethylene-vinyl ester copolymer with a higher ester content, the latter preferably a higher molecular weight copolymer with a lower ester content, the esters preferably, but not necessarily, both being vinyl acetate.

In DE-AS-2407158, middle distillate flow improvers are described, comprising a mixture of low molecular weight ethylene-vinyl ester and ethylene-acrylic acid ester copolymers, both containing at least 40 mole per cent of the ester component.

The present invention is concerned to provide an oil, especially a fuel oil, additive effective to improve low temperature flow of the oil, and is based on the observation that a composition comprising at least two different copolymers of ethylene with an unsaturated ester, or a composition comprising a copolymer of ethylene with at least two different types of unsaturated ester-derivable units, is an effective cold flow improver having advantages over previously proposed compositions.

In a first aspect, the present invention provides a composition comprising (a) an oil soluble ethylene copolymer having, in addition to units derived from ethylene, units of the formula

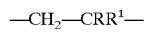

$$-CH_2-CRR^1- \qquad \text{I}$$

and units of the formula

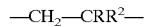

$$-CH_2-CRR^2- \qquad \text{II}$$

the total molar proportion of units of the formulae I and II in the copolymer being less than lot, wherein each R independently represents H or CH$_3$, and each R$^1$ and R$^2$ independently represents a group of the formula COOR$^3$ or OOCR$^3$, wherein each R$^3$ independently represents a hydrocarbyl group, provided that the units of the formula I are different from the units of the formula II, or (b) comprising (i) an oil-soluble ethylene copolymer having, in addition to units derived from ethylene, less than 10 molar per cent of units of the formula

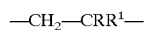

$$-CH_2-CRR^1- \qquad \text{I}$$

and (ii) an oil-soluble ethylene copolymer having, in addition to units derived from ethylene, less than 10 molar per cent of units of the formula

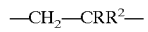

$$-CH_2-CRR^2- \qquad \text{II}$$

wherein R, R$^1$, and R$^2$ have the meanings given above, provided that copolymer (i) differs from copolymer (ii). Advantageously, R represents H.

As used in this specification the term "hydrocarbyl" refers to a group having a carbon atom directly attached to the rest of the molecule and having a hydrocarbon or predominantly hydrocarbon character. Among these, there may be mentioned hydrocarbon groups, including aliphatic, (e.g., alkyl or alkenyl), alicyclic (e.g., cycloalkyl or cycloalkenyl), aromatic, aliphatic and alicyclic-substituted aromatic, and aromatic-substituted aliphatic and alicyclic groups. Aliphatic groups are advantageously saturated. These groups may contain non-hydrocarbon substituents provided their presence does not alter the predominantly hydrocarbon character of the group. Examples include keto, halo, hydroxy, nitro, cyano, alkoxy and acyl. If the hydrocarbyl group is substituted, a single (mono) substituent is preferred. Examples of substituted hydrocarbyl groups include 2-hydroxyethyl, 3-hydroxypropyl, 4-hydroxybutyl, 2-ketopropyl, ethoxyethyl, and propoxypropyl. The groups may also or alternatively contain atoms other than carbon in a chain or ring otherwise composed of carbon atoms. Suitable hetero atoms include, for example, nitrogen, sulfur, and, preferably, oxygen. Advantageously, the hydrocarbyl group contains at most 30, preferably at most 15, more preferably at most 10 and most preferably at most 8, carbon atoms.

Advantageously R$^3$ represents an alkenyl or as indicated above, preferably, an alkyl group, which is advantageously linear. If the alkyl or alkenyl group is branched, for example, as in the 2-ethylhexyl group, the α-carbon atom is advantageously part of a methylene group. Advantageously, the alkyl or alkenyl group contains up to 30 carbon atoms, preferably from 1 (2 in the case of alkenyy) to 14 carbon atoms, and more preferably from 4 to 10 carbon atoms. As examples of alkyl or alkenyl groups there may be mentioned propyl, n-butyl, iso-butyl, and isomers, preferably the linear isomers, of pentyl, hexyl, heptyl, octyl, nonyl, decyl, undecyl, dodecyl, tridecyl, tetradecyl, pentadecyl, hexadecyl, heptadecyl, octadecyl, nonadecyl and icosyl, and their corresponding alkenyl, advantageously alk-omega-enyl, radicals. When R$^1$ and/or R$^2$ are of the formula OOCR$^3$, R$^3$ most preferably represents propyl, butyl, or pentyl, and as indicated above, advantageously the linear isomer.

As cycloalkyl, alkaryl and aryl radicals, there may be mentioned, for example, cyclohexyl, benzyl and phenyl.

The copolymer or copolymers may also contain units of formulae other than those mentioned above, for example units of the formula

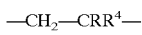   II where $R^4$ represents —OH, or of the formula

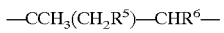   IV where $R^5$ and $R^6$ each independently represent hydrogen or an alkyl group with up to 4 carbon atoms, the units IV advantageously being derived from isobutylene, 2-methylbut-2-ene or 2-methylpent-2-ene.

Units of the formula I or II may be terminal units but are advantageously internal units. Advantageously, units of the formula —CRR$^1$—CH$_2$— and —CRR$^2$—CH$_2$— represent less than 7.5, preferably from 0.3 to 7.5, and most preferably from 3.5 to 7.0, mole per cent of the polymer.

The copolymer (a) and each of copolymers b(i) and (ii) advantageously have a number average molecular weight, as measured by gel permeation chromatography, of up to 20,000, advantageously up to 15,000, more advantageously in the range of 1,200 to 10,000, preferably 3,000 to 10,000 and most preferably about 5,000. The preferred number average molecular weight will depend to some extent on the number of carbon atoms in $R^3$, the higher that number the higher the preferred molecular weight within the range above. Advantageously, the number average molecular weights of the polymers b(i) and b(ii) differ by at most 2000, more especially by at most 1000.

Polymers in which $R^1$ or $R^2$ represents OOCR$^3$ are preferred and more preferably both $R^1$ and $R^2$ both represent OOCR$^3$.

It is within the scope of the invention to use both a polymer (a) and the mixture of polymers (b) in the same additive composition. It is also within the scope of the invention to employ a polymer (a) having more than two different units of types I and II, or mixtures of two or more polymers (a). When employing the mixture of polymers (b), units I in polymer (b)i are advantageously different from units II in polymer (b)ii, but it is also within the scope of the invention to employ a mixture of copolymers in which units I and II are the same, provided that the polymers differ in at least one respect, for example, proportion of units I and II in the polymer, the molecular weight, or the molecular weight distribution, of the polymer, the linearity of the polymer, or the presence of other units in the polymer.

The invention also provides an oil containing the additive composition, and an additive concentrate comprising the additive composition in admixture with an oil or a solvent miscible with the oil. The invention further provides the use of the additive composition to improve the low temperature properties of an oil. The oil may be a crude oil, i.e. oil obtained directly from drilling and before refining, the compositions of this invention being suitable for use as flow improvers therein.

The oil may be a lubricating oil, which may be an animal, vegetable or mineral oil, such, for example, as petroleum oil fractions ranging from naphthas or spindle oil to SAE 30, 40 or 50 lubricating oil grades, castor oil, fish oils or oxidized mineral oil. Such an oil may contain additives depending on its intended use; examples are viscosity index improvers such as ethylene-propylene copolymers, succinic acid based dispersants, metal containing dispersant additives and zinc dialkyl-dithiophosphate antiwear additives. The compositions of this invention may be suitable for use in lubricating oils as flow improvers, pour point depressants or dewaxing aids.

The oil may be a fuel oil, especially a middle distillate fuel oil. Such distillate fuel oils generally boil within the range of from 110° C. to 500° C., e.g. 150° to 400° C. The fuel oil may comprise atmospheric distillate or vacuum distillate, or cracked gas oil or a blend in any proportion of straight run and thermally and/or catalytically cracked distillates. The most common petroleum distillate fuels are kerosene, jet fuels, diesel fuels, heating oils and heavy fuel oils. The heating oil may be a straight atmospheric distillate, or it may contain minor amounts, e.g. up to 35 wt %, of vacuum gas oil or cracked gas oils or of both. The above-mentioned low temperature flow problem is most usually encountered with diesel fuels and with heating oils. The invention is also applicable to vegetable-based fuel oils, for example rape seed oil.

The additive or additives should preferably be soluble in the oil to the extent of at least 1000 ppm by weight per weight of oil at ambient temperature. However, at least some of the additive may come out of solution near the cloud point of the oil and function to modify the wax crystals that form.

In the composition (b) according to the invention, polymer (i) is advantageously an ethylene-vinyl acetate or propionate copolymer. Advantageously, the linearity of the polymer as expressed by the number of methyl groups per 100 methylene units, as measured by proton NMR, is from 1 to 15.

The copolymers, especially the ethylene-vinyl acetate or propionate copolymer may be made by any of the methods known in the art, e.g., by solution polymerization with free radical initiation, or by high pressure polymerization, conveniently carried out in an autoclave or a tubular reactor. Alternatively, the copolymer may be made by saponification and re-esterification of an ethylene-vinyl acetate or propionate, or an ethylene-methyl or ethyl (meth)acrylate, copolymer.

A further method of making the copolymer is by transesterification, provided that the entering acid or alcohol is less volatile than that being removed.

If desired all, or substantially all, existing ester groups may be hydrolysed and completely replaced by the desired chain substituents. Alternatively, a proportion only may be hydrolysed, so that the resulting polymer contains, for example, acetate side chains and chains of longer length.

Where a copolymer (a) is being made, a mixture of ester monomer (where the polymer is being made directly) or of acid or alcohol reactants (where re-esterification or transesterification is being effected) is used in appropriate proportions, taking any differences in reactivity of the materials into account.

In embodiment (a) of the invention, units I and units II are preferably present in a molar ratio in the range of 2:98 to 98:2, advantageously 5:95 to 95:5, more especially from 1:10 to 10:1. In embodiment (b) polymers containing units I and units II are advantageously present in a weight ratio of from 10:1 to 1:10, preferably from 3:1 to 1:3, and more preferably in a ratio of about 1:1.

The additive composition and the oil composition may contain other additives for improving low temperature and/or other properties, many of which are in use in the art or known from the literature.

For example, the composition may also contain a further ethylene-vinyl ester copolymer. As mentioned above, with reference to U.S. Pat. No. 3,961,916, flow improver compositions may comprise a wax growth arrestor and a nucleating agent. Without wishing to be bound by any theory, the applicants believe that the additive compositions of the present invention act primarily as nucleators, and benefit from the addition of arrestors, e.g., an ethylene-vinyl ester, especially acetate, having a number average molecular weight in the range of at most 14,000, and a vinyl ester content of 7.5 to 35 molar per cent, advantageously an ester content higher, and preferably at least 2, more preferably at least 3, molar per cent higher, than that of any ester in the additive composition as defined above.

The additive composition may also comprise a comb polymer. Such polymers are discussed in "Comb-Like Polymers. Structure and Properties", N. A. Platé and V. P. Shibaev, J. Poly. Sci. Macromolecular Revs., 8, p 117 to 253 (1974).

Advantageously, the comb polymer is a homopolymer having, or a copolymer at least 25 and preferably at least 40, more preferably at least 50, molar per cent of the units of which have, side chains containing at least 6, and preferably at least 10, atoms.

As examples of preferred comb polymers there may be mentioned those of the general formula

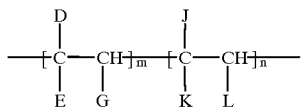

wherein D=$R^{11}$ $COOR^{11}$, $OCOR^{11}$, $R^{12}COOR^{11}$, or $OR^{11}$,
E=H, $CH_3$, D, or $R^{12}$,
G=H or D
J=H, $R^{12}$, $R^{12}COOR^{11}$, or an aryl or heterocyclic group,
K=H, $COOR^{12}$, $OCOR^{12}$, $OR^{12}$, or COOH,
L=H, $R^{12}$, $COOR^{12}$, $OCOR^{12}$, COOH, or aryl,
$R^{11} \geq C_{10}$ hydrocarbyl,
$R^{12} \geq C_1$ hydrocarbyl,
and m and n represent mole ratios, m being within the range of from 1.0 to 0.4, n being in the range of from 0 to 0.6. $R^{11}$ advantageously represents a hydrocarbyl group with from 10 to 30 carbon atoms, while $R^{12}$ advantageously represents a hydrocarbyl group with from 1 to 30 carbon atoms.

The comb polymer may contain units derived from other monomers if desired or required. It is within the scope of the invention to include two or more different comb copolymers.

These comb polymers may be copolymers of maleic anhydride or fumaric acid and another ethylenically unsaturated monomer, e.g., an α-olefin or an unsaturated ester, for example, vinyl acetate. It is preferred but not essential that equimolar amounts of the comonomers be used although molar proportions in the range of 2 to 1 and 1 to 2 are suitable. Examples of olefins that may be copolymerized with e.g., maleic anhydride, include 1-decene, 1-dodecene, 1-tetradecene, 1-hexadecene, and 1-octadecene.

The copolymer may be esterified by any suitable technique and although preferred it is not essential that the maleic anhydride or fumaric acid be at least 50% esterified. Examples of alcohols which may be used include n-decan-1-ol, n-dodecan-1-ol, n-tetradecan-1-ol, n-hexadecan-1-ol, and n-octadecan-1-ol. The alcohols may also include up to one methyl branch per chain, for example, 1-methylpentadecan-1-ol, 2-methyltridecan-1-ol. The alcohol may be a mixture of normal and single methyl branched alcohols. It is preferred to use pure alcohols rather than the commercially available alcohol mixtures but if mixtures are used the $R^{12}$ refers to the average number of carbon atoms in the alkyl group; if alcohols that contain a branch at the 1 or 2 positions are used $R^{12}$ refers to the straight chain backbone segment of the alcohol.

These comb polymers may especially be fumarate or itaconate polymers and copolymers such for example as those described in European Patent Applications 153176, 153177 and 225688, and WO 91/16407.

Particularly preferred fumarate comb polymers are copolymers of alkyl fumarates and vinyl acetate, in which the alkyl groups have from 12 to 20 carbon atoms, more especially polymers in which the alkyl groups have 14 carbon atoms or in which the alkyl groups are a mixture of $C_{14}/C_{16}$ alkyl groups, made, for example, by solution copolymerizing an equimolar mixture of fumaric acid and vinyl acetate and reacting the resulting copolymer with the alcohol or mixture of alcohols, which are preferably straight chain alcohols. When the mixture is used it is advantageously a 1:1 by weight mixture of normal $C_{14}$ and $C_{16}$ alcohols. Furthermore, mixtures of the $C_{14}$ ester with the mixed $C_{14}/C_{16}$ ester may advantageously be used. In such mixtures, the ratio of $C_{14}$ to $C_{14}/C_{16}$ is advantageously in the range of from 1:1 to 4:1, preferably 2:1 to 7:2, and most preferably about 3:1, by weight.

Other suitable comb polymers are the polymers and copolymers of α-olefins and esterified copolymers of styrene and maleic anhydride, and esterified copolymers of styrene and fumaric acid; mixtures of two or more comb polymers may be used in accordance with the invention and, as indicated above, such use may be advantageous.

The additive composition may also comprise polar nitrogen compounds, for example those described in U.S. Pat. No. 4,211,534, especially an amide-amine salt of phthalic anhydride with two molar proportions of hydrogenated tallow amine, or the corresponding amide—amine salt of ortho-sulphobenzoic anhydride.

The additive composition of the invention may also comprise a copolymer of ethylene and at least one α-olefin, having a number average molecular weight of at least 30,000. Preferably the α-olefin has at most 20 carbon atoms. Examples of such olefins are propylene, 1-butene, isobutene, n-octene-1, isooctene-1, n-decene-1, and n-dodecene-1. The copolymer may also comprise small amounts, e.g, up to 10% by weight of other copolymerizable monomers, for example olefins other than α-olefins, and non-conjugated dienes. The preferred copolymer is an ethylene-propylene copolymer. It is within the scope of the invention to include two or more different ethylene-α-olefin copolymers of this type.

The number average molecular weight of the ethylene-α-olefin copolymer is, as indicated above, at least 30,000, as measured by gel permeation chromatography (GPC) relative to polystyrene standards, advantageously at least 60,000 and preferably at least 80,000. Functionally no upper limit arises but difficulties of mixing result from increased viscosity at molecular weights above about 150,000, and preferred molecular weight ranges are from 60,000 and 80,000 to 120,000.

Advantageously, the copolymer has a molar ethylene content between 50 and 85 per cent. More advantageously, the ethylene content is within the range of from 57 to 80%, and preferably it is in the range from 58 to 73%; more preferably from 62 to 71%, and most preferably 65 to 70%.

Preferred ethylene-a-olefin copolymers are ethylene-propylene copolymers with a molar ethylene content of from 62 to 71% and a number average molecular weight in the range 60,000 to 120,000, especially preferred copolymers are ethylene-propylene copolymers with an ethylene content of from 62 to 71% and a molecular weight from 80,000 to 100,000.

The copolymers may be prepared by any of the methods known in the art, for example using a Ziegler type catalyst. The polymers should be substantially amorphous, since highly crystalline polymers are relatively insoluble in fuel oil at low temperatures.

The additive composition may also comprise a further ethylene-α-olefin copolymer, advantageously with a number average molecular weight of at most 7500, advantageously from 1,000 to 6,000, and preferably from 2,000 to 5,000, as measured by vapour phase osmometry. Appropriate α-olefins are as given above, or styrene, with propylene again being preferred. Advantageously the ethylene content is from 60 to 77 molar per cent although for ethylene-propylene copolymers up-to 86 molar per cent by weight ethylene may be employed with advantage.

The composition may also comprise poly(ethylene glycol) esters, advantageously of fatty acids containing from 18 to 22 carbon atoms in the chain, especially when the fuel being treated lacks higher alkanes that act as wax crystallization nucleators.

In addition, the additive composition and the fuel oil composition may contain additives for other purposes, e.g., for reducing particulate emission or inhibiting colour and sediment formation during storage.

The fuel oil composition of the invention advantageously contains the additive of the invention, i.e., components (a) and (b) above, in a total proportion of 0.0005% to 1%, advantageously 0.001 to 0.1%, and preferably 0.04 to 0.06% by weight, based on the weight of fuel.

The following Examples, in which parts and percentages are by weight, and number average molecular weights are measured by gel permeation chromatography, illustrate the invention:

EXAMPLES A to C—MANUFACTURE OF POLYMERS

Example A 450 g of an ethylene-vinyl acetate copolymer containing 13.5% by weight vinyl acetate, Mn 5,000, degree of branching $6CH_3/100\ CH_2$, is charged into a flask equipped with a condenser and heated to 60° C. with stirring under a nitrogen blanket. 47.5 g of sodium methoxide in 50 g n-butanol is added cautiously to the polymer, and subsequently a further 200 g of n-butanol. The solution changes from clear to orange, and the temperature falls to 46° C. The mixture is then heated to 90° C., the colour turning to deep red, and maintained at that temperature with stirring for 2 hours.

50 g of the resulting polymer (Mn 5600) are dissolved in an anhydrous solvent mixture comprising 300 ml toluene and 8.25 g pyridine. 14 ml hexanoyl chloride in 250 ml toluene are added dropwise and the resulting mixture stirred for 5 hours at room temperature. The solids are filtered, washed and solvent removed to yield 38 g of a viscous polymer (Mn 6000) in which $R^1$ represents —$OOCR^3$, $R^3$ representing n-pentyl.

Example B

In a similar manner a polymer, Mn 5000, in which $R^3$ represents n-propyl was prepared using butyryl chloride.

Example C

A mixture containing vinyl acetate, isobutylene and ethylene, with 500 ppm t-butyl peroctoate, was polymerized in an autoclave at 1200 bar, 220° C.

An ethylene/vinyl acetate/isobutylene terpolymer, with 13.5% vinyl acetate and 7.8% isobutylene by weight, 9.3 $CH_3$ units per hundred $CH_2$ by NMR, Mn 5450 was recovered.

The following fuels were used in the numbered Examples below:

| Fuel | 1 | 2 |
|---|---|---|
| Cloud Point, ° C. | −3 | −3 |
| CFPP, ° C. | −4 | −5 |
| IBP, ° C. | 162 | 168 |
| FBP, ° C. | 375 | 371 |
| 90–20, ° C. | 126 | 127 |
| FBP-90, ° C. | 43 | 41 |
| % Wax at 10° C. below Cloud Point | 1.4 | 1.5 |

CFPP is measured as described in "Journal of the Institute of Petroleum", 52 (1966), 173.

Examples 1 and 2

In these examples, copolymers made as described in Examples A and B above and the polymer from which they were derived, containing 13.5% vinyl acetate, identified below as Polymer 1 were used as additives in Fuel 1 at a total treat rate of 50 ppm. Where a mixture of two was used, they were present in equal proportions.

| Example | Additive | CFPP ° C. |
|---|---|---|
| (Comparison) | Polymer 1 | −11 |
| 1 | 1/A | −14 |
| 2 | 1/B | −12 |

Examples 3 and 4

In these Examples, copolymers made as described in Examples A, B and C were used as additives in Fuel 2 at a total treat rate of 50 ppm; where a mixture of two additives was used they were present in equal proportions.

| Example | Additive | CFPP ° C. |
|---|---|---|
| (Comparison) | Polymer C | −9 |
| 3 | C/A | −11 |
| 4 | C/B | −12 |

The results of the numbered Examples show the improvements in CFPP resulting from the use of a mixture of two nucleators.

What is claimed is:

1. A fuel oil composition comprising a fuel oil and an additive composition comprising:

(a) an oil soluble ethylene copolymer having, in addition to units derived from ethylene, units of the formula

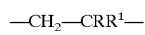  I and units of the formula

  II the total molar proportion of units of the formulae I and II in the copolymer being less than 10%, wherein each R independently represents H or $CH_3$, and each $R^1$ and $R^2$ independently represents a group of the formula $COOR^3$ or $OOCR^3$, wherein each $R^3$ independently represents alkyl or alkenyl having 4 to 10 carbon atoms provided that the units of the formula I are different from the units of the formula II or (b) comprising (i) an oil-soluble ethylene copolymer having, in addition to units derived from ethylene, less than 10 molar per cent of units of the formula $$—CH_2—CRR^1— \qquad \qquad I$$

and (ii) an oil-soluble ethylene copolymer having, in addition to units derived from ethylene, less than 10 molar per cent of units of the formula $$—CH_2—CRR^2— \qquad \qquad II$$

wherein R, $R^1$, and $R^2$ have the meanings given above, provided that $R^3$ in $COOR^3$ represents alkyl or alkenyl having 4 to 10 carbon atoms, and provided that copolymer (i) differs from copolymer (ii) by at least 2000 in number average molecular weights.

2. A composition as claimed in claim 1, which also comprises a polar nitrogen compound.

3. A composition as claimed in claim 1 or 2, which contains the additive composition in a total proportion of from 0.005 to 1%, based on the weight of fuel oil.

4. A composition as claimed in claim 1, wherein $R^1$ and $R^2$ each represents —$OOCR^3$.

5. A composition as claimed in claim 1, wherein R represents H.

6. A composition as claimed in claim 1, which is a composition (b), and in which $R^1$ and $R^2$ each represent a group of the formula $OOCR^3$ in which $R^3$ represents an alkyl group having from 4 to 10 carbon atoms.

7. A composition as claimed in claim 6, wherein the polymer components (b) (i) and (ii) each have a number average molecular weight (Mn) of at most 20,000.

8. A composition as claimed in claim 7, wherein Mn is in the range of from 3,000 to 6,000.

9. A composition as claimed in claim 3, which contains the additive in a total proportion of from 0.001 to 0.1% based on the weight of oil.

10. A composition as claimed in claim 7, wherein the polymer components (b) (i) and (ii) each contain from 0.3 to 7.5 mole per cent of units of the formula I or formula II.

11. A composition as claimed in claim 1, wherein the or at least one polymer has been made by saponification and re-esterification of an ethylene-unsaturated ester copolymer.

12. A composition as claimed in claim 1, wherein $R^1$ and $R^2$ both represent —$OOCR3$ and the polymer has been made by saponification and re-esterification of an ethylene-vinyl acetate copolymer.

13. A composition as claimed in claim 9, which contains the additive in a total proportion of from 0.004 to 0.06%, based on the weight of oil.

14. A composition as claimed in claim 1, which comprises a mixture of two or more different comb polymers.

15. A composition as claimed in claim 1, which also comprises a comb polymer.

16. A composition as claimed in claim 15, wherein the mixture comprises (i) a $C_{14}$ fumarate ester-vinyl acetate copolymer and (ii) a $C_{14}/C_{16}$ fumarate ester-vinyl acetate copolymer.

17. A composition as claimed in claim 15, wherein the comb polymer is of the general formula $$-\!\!\left[\!\!\begin{array}{c}D\\|\\C\\|\\E\end{array}\!\!-\!\!\begin{array}{c}\\ \\CH\\|\\G\end{array}\!\!\right]_{\!m}\!\!-\!\!\left[\!\!\begin{array}{c}J\\|\\C\\|\\K\end{array}\!\!-\!\!\begin{array}{c}\\ \\CH\\|\\L\end{array}\!\!\right]_{\!n}\!\!-$$

wherein D=$R^{11}$, $COOR^{11}$, $OCOR^{11}$, $R^{12}COOR^{11}$, or $OR^{11}$,

E=H, $CH_3$, D, or $R^{12}$,

G=H or D

J=H, $R^{12}$, $R^{12}COOR^{11}$, or an aryl or heterocyclic group,

K=H, $COOR^{12}$, $OCOR^{12}$, $OR^{12}$, or COOH,

L=H, $R^{12}$, $COOR^{12}$, $OCOR^{12}$, COOH, or aryl, $R^{11}$ $C_{10}$ hydrocarbyl, $R^{12}$ $C_1$ hydrocarbyl, and m and n represent mole ratios, m being within the range of from 1.0 to 0.4, n being in the range of from 0 to 0.6.

18. A composition as claimed in claim 17, wherein the comb polymer is a copolymer of vinyl acetate and the fumarate ester.

19. A composition as claimed in claim 18, wherein the ester groups are alkyl groups having from 12 to 20 carbon atoms.

20. A composition as claimed in claim 19, wherein the ester groups are derived from an alcohol having 14 carbon atoms, or a mixture of alcohols having 14 and 16 carbon atoms.

* * * * *